UNITED STATES PATENT OFFICE.

THOMAS LEES BARTLESON, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF MAKING PHOSPHOROUS OXYCHLORIDE.

1,424,193. Specification of Letters Patent. Patented Aug. 1, 1922.

No Drawing. Application filed October 21, 1920. Serial No. 418,574.

*To all whom it may concern:*

Be it known that I, THOMAS LEES BARTLESON, a citizen of the United States, and a resident of Wilmington, in the county of New Castle and State of Delaware, have invented a certain new and useful Process of Making Phosphorous Oxychloride, of which the following is a specification.

This invention relates to the production of phosphorous oxychloride, and comprises treating an ortho- or meta phosphate at a high temperature with phosgene.

I have discovered that phosphorous oxychloride may be obtained, with a good yield, by bringing phosgene into contact with a phosphate of an alkali-forming metal, as for example, calcium and sodium phosphates, at a temperature between about 300 and 500° C. The reaction proceeds rapidly in accordance with the following equation:

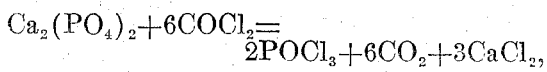

so that the intervention of extraneous substances to accelerate the reaction is not required.

The new process may be illustrated by the following example:—

Pure granulated calcium orthophosphate is heated in a tube furnace to a temperature ranging between 325 and 500° C. Phosgene is then passed slowly through the mass, preferably at a rate of ten grams per twenty cubic inches of mass per hour. The phosphorous oxychloride distills over and is condensed. Carbon dioxide with some uncombined phosgene escapes at the end of the system and may be recovered and utilized otherwise, while a mixture of calcium phosphate and calcium chloride remains in the reaction vessel.

This mixture contains from 30 to 70% of untransformed calcium phosphate and may be washed with water to remove the calcium chloride, when the recovered calcium phosphate can be returned to the system for further treatment. In this manner it is possible to obtain a yield of phosphorous oxychloride equal to 93% of the theoretical yield, based on the calcium phosphate consumed.

In place of the calcium phosphate in the above example, I may use the phosphate of another alkaline earth metal or the phosphate of an alkali metal.

I claim:—

1. The process of producing phosphorous oxychloride which comprises bringing phosgene into contact with a metal phosphate at a high temperature.

2. The process of producing phosphorous oxychloride which consists in causing phosgene to react with a phosphate of an alkali-forming metal at a temperature between about 300 and 500° C.

3. The process of producing phosphorous oxychloride which comprises bringing phosgene into contact with calcium phosphate at a temperature between 325 and 500° C.

4. The process of producing phosphorous oxychloride which comprises bringing phosgene into contact with an alkali-metal phosphate at a temperature between 325 and 500° C.

In testimony whereof I affix my signature.

THOMAS LEES BARTLESON.